(12) United States Patent
Collet et al.

(10) Patent No.: US 8,290,664 B2
(45) Date of Patent: Oct. 16, 2012

(54) METHOD AND DEVICE FOR MEASURING THE ANGULAR POSITION, BETWEEN TWO STEERING LOCK STOPS ON A VEHICLE STEERING WHEEL

(75) Inventors: Michel Collet, Toulouse (FR); Eric Servel, Roques sur Garonne (FR); Yves Dordet, Fonsorbes (FR)

(73) Assignee: Continental Automotive France, Toulouse (FR)

( * ) Notice: Subject to any disclaimer, the term of this patent is extended or adjusted under 35 U.S.C. 154(b) by 1058 days.

(21) Appl. No.: 12/294,047

(22) PCT Filed: Mar. 26, 2007

(86) PCT No.: PCT/EP2007/002643
§ 371 (c)(1),
(2), (4) Date: Sep. 23, 2008

(87) PCT Pub. No.: WO2007/121816
PCT Pub. Date: Nov. 1, 2007

(65) Prior Publication Data
US 2009/0234540 A1  Sep. 17, 2009

Related U.S. Application Data

(60) Provisional application No. 60/791,693, filed on Apr. 13, 2006.

(30) Foreign Application Priority Data

Nov. 15, 2006  (FR) ...................................... 06 09978

(51) Int. Cl.
*B63G 8/20* (2006.01)

(52) U.S. Cl. .................. 701/42; 701/1; 701/36; 701/41
(58) Field of Classification Search .................. None
See application file for complete search history.

(56) References Cited

U.S. PATENT DOCUMENTS 5,406,155 A * 4/1995 Persson ...................... 310/68 B
(Continued)

FOREIGN PATENT DOCUMENTS

DE  10 2004 028855  1/2005
(Continued)

OTHER PUBLICATIONS

International Search Report dated Jul. 12, 2007, in PCT application.

*Primary Examiner* — Khoi Tran
*Assistant Examiner* — Jonathan L Sample
(74) *Attorney, Agent, or Firm* — Young & Thompson

(57) ABSTRACT

A method and a device for measuring the angular position, between two steering locks, of a steering wheel of a vehicle, includes equipping the vehicle with a main gearing (4, 5) designed, once the vehicle has started, to make it possible to calculate the absolute angular position of the steering wheel from data provided by a first angular sensor (15) associated with this main gearing. According to the invention, the vehicle is additionally equipped with an auxiliary gearing composed of one of the gearwheels (5) of the main gearing, of a third gearwheel (8), and of intermediate elements (6, 7, 9) for sequentially driving the third gearwheel (8) that are able to make it possible, upon starting of the vehicle, to measure the angular position of the third gearwheel (8) via a second angular sensor (16) associated with this gearwheel.

20 Claims, 3 Drawing Sheets

U.S. PATENT DOCUMENTS

| | | | |
|---|---|---|---|
| 5,930,905 A * | 8/1999 | Zabler et al. | 33/1 PT |
| 6,539,329 B2 * | 3/2003 | Kato et al. | 702/151 |
| 6,697,680 B2 * | 2/2004 | Lin et al. | 700/13 |
| 6,745,116 B2 * | 6/2004 | Takuma et al. | 701/41 |
| 7,017,274 B2 * | 3/2006 | Stobbe | 33/1 PT |
| 7,085,638 B2 * | 8/2006 | Knoll | 701/41 |
| 7,201,069 B2 * | 4/2007 | Sakabe | 73/862.31 |
| 7,295,907 B2 * | 11/2007 | Lu et al. | 701/41 |
| 7,382,121 B2 * | 6/2008 | Shiraga et al. | 324/207.25 |
| 7,637,020 B2 * | 12/2009 | Maier et al. | 33/1 PT |
| 2002/0097044 A1 * | 7/2002 | Tateishi et al. | 324/207.21 |
| 2002/0111763 A1 * | 8/2002 | Koga | 702/151 |
| 2004/0059486 A1 * | 3/2004 | Takuma et al. | 701/41 |
| 2004/0078166 A1 | 4/2004 | Shin | |
| 2005/0114075 A1 * | 5/2005 | Lee et al. | 702/151 |
| 2005/0171727 A1 * | 8/2005 | Sakabe et al. | 702/151 |
| 2006/0015227 A1 * | 1/2006 | Knoll | 701/41 |
| 2006/0152214 A1 * | 7/2006 | Hatano | 324/207.25 |
| 2006/0279278 A1 * | 12/2006 | Desbiolles et al. | 324/207.25 |
| 2007/0175697 A1 * | 8/2007 | Choi | 180/444 |
| 2008/0249683 A1 * | 10/2008 | Wu et al. | 701/41 |
| 2009/0188743 A1 * | 7/2009 | Ruetz | 180/446 |
| 2010/0235054 A1 * | 9/2010 | Hoskins et al. | 701/42 |

FOREIGN PATENT DOCUMENTS

| | | |
|---|---|---|
| DE | 10 2004 026868 | 12/2005 |
| EP | 1 225 419 | 7/2002 |
| EP | 1 522 486 | 4/2005 |

* cited by examiner

METHOD AND DEVICE FOR MEASURING THE ANGULAR POSITION, BETWEEN TWO STEERING LOCK STOPS ON A VEHICLE STEERING WHEEL

The invention relates to a method and a device for measuring the angular position, between two steering locks, of a steering wheel of a vehicle.

More specifically, the invention is aimed at a measuring device comprising a gearing, termed main gearing, composed of a first gearwheel, which is coupled in rotation to the steering wheel, and of a second gearwheel, and an angular sensor having a given measurement range, said sensor, associated with the second gearwheel, being designed to make it possible:
- upon a movement of the second gearwheel within the measurement range of this sensor, to calculate values representative of the angular positions of this gearwheel within said measurement range, and
- at the ends of the measurement range, to positively or negatively increment a counter for storing the number of revolutions made.

As particularly described in EP 1 225 419, once the vehicle has started, that is to say once the "key on" position is set, such a measuring device makes it possible to calculate the absolute angular position of the steering wheel from the angular values and from the values of the counter obtained by means of a single angular sensor.

Furthermore, in order to store the information relating to the number of revolutions, the measuring device described in EP 1 225 419 comprises a nonvolatile memory in which this information is stored.

However, the principle of this storage has a major disadvantage stemming from the fact that if any movements of the steering wheel are made in the absence of power supply to the nonvolatile memory, these movements are not at all detected or transmitted, with the result that the absolute position information subsequently provided by the measuring device may prove to be completely erroneous.

In order to overcome this disadvantage, another solution, such as the one particularly described in US 2005/0114075, US 2004/0059486 or EP 1 522 486, has consisted in producing measuring devices comprising two main gearings, that is to say two gearings comprising a common driving gearwheel coupled in rotation to the steering wheel, said gearings each being associated with an angular sensor and having, furthermore, different transmission ratios designed to generate an angular phase shift between the two sensors upon each revolution of the steering wheel.

According to this principle, the combination of the two main gearings makes it possible to provide and to retain information representative of the absolute angular position of the steering wheel, even in the absence of electrical power supply to the measuring device.

However, such a measuring device in turn also has a disadvantage resulting from the fact that only the combination of the information provided by the angular sensors makes it possible to provide viable information. What this means in fact is that any failure of one of the two subassemblies (gearing/sensor) making up this measuring device is sufficient to render the latter completely "mute".

The present invention is aimed at overcoming the aforementioned disadvantages of the above-described measuring devices, and its main objective is to provide a measuring device comprising a single main gearing, that is to say of the type described in EP 1 225 419, but without the disadvantages thereof, that is to say capable of delivering and retaining information representative of the absolute angular position of a vehicle steering wheel, even in the absence of electrical power supply to the measuring device.

Another objective of the invention is to provide a measuring device designed to allow a "safety" operating mode in the event of a failure of the measuring assembly comprising the main gearing.

Another objective of the invention is to provide a measuring device incorporating self-monitoring functions.

Accordingly, the invention is aimed, firstly, at a method of measuring the angular position, between two steering locks, of a steering wheel of a vehicle, consisting in equipping said vehicle with a gearing, termed main gearing, composed of a first gearwheel, which is coupled in rotation to the steering wheel, and of a second gearwheel, and in measuring the angular position of the second gearwheel by means of a first angular sensor having a given measurement range, said first sensor, associated with the second gearwheel, being designed to make it possible:
- upon a movement of the second gearwheel within the measurement range of this first sensor, to calculate values representative of the angular positions of this gearwheel within said measurement range, and
- at the ends of the measurement range, to positively or negatively increment a counter for storing the number of revolutions made.

According to the invention, this measuring method consists in:
- equipping the vehicle with a second gearing, termed auxiliary gearing, composed of one of the gearwheels of the main gearing, of a third gearwheel, and of intermediate means for sequentially driving the third gearwheel that are able to rotate it stepwise by a predetermined angular value ($\alpha$) upon each complete rotation of the associated gearwheel of the main gearing, where ($\alpha$) is such that, in the course of a rotational travel of the steering wheel between the two steering locks, the total angular travel of the third gearwheel is less than or equal to 360°,
- measuring the angular position of the third gearwheel by means of a second angular sensor associated with said third gearwheel, and
- managing the data provided by the first and second angular sensors in such a way that:
- once the vehicle has started, in an "active" mode thereof, the absolute angular position of the steering wheel is calculated from the angular values and from the values of the counter obtained by means of the first angular sensor, and
- upon starting of the vehicle, in a "wake" mode, the absolute angular position of the steering wheel is calculated from, on the one hand, the value representative of the angular position of the second gearwheel obtained by means of the first angular sensor, and, on the other hand, from the value of the angular position of the third gearwheel obtained by means of the second angular sensor and representative of the number of revolutions made by the steering wheel.

Therefore, such a measuring device is, firstly, designed in such a way that, following starting of the vehicle, the absolute angular position of the steering wheel is calculated from values obtained by means of a single angular sensor.

Furthermore, in the active mode, the data provided by this angular sensor can advantageously be used for purposes of calculating the rotational speed of the steering wheel.

By comparison with the device described in EP 1 225 419, this measuring device has, however, the essential specific feature of comprising auxiliary means designed to make it possible to define the absolute position of the steering wheel irrespective of the state of electrical power supply to said measuring device.

Moreover, in the event of any failure of the first angular sensor in the active mode, the design of the measuring device advantageously makes it possible to establish an emergency stop mode of the vehicle during which the steering is managed using data provided by the second angular sensor. To this end, for example, the precision of this management can be increased by storing a table of correspondence between the values provided by the second angular sensor and the corresponding values provided by the first angular sensor, in a prior phase, for the entire travel of the steering wheel and then by using said correspondence table.

According to another advantageous embodiment of the invention and for safety purposes, such a correspondence table makes it possible, in the active mode of the vehicle, to establish a procedure of comparing the values provided by the two angular sensors with the stored values that is intended to emit a malfunction signal when there is a lack of correspondence between said values.

Still with a view to safety, the measuring method according to the invention further advantageously allows, in the active mode, the data provided by the second angular sensor to be used for purposes of redundant calculation and for checking the value of the number of revolutions made that is provided by the storage counter.

The invention extends to a device for measuring the angular position of a steering wheel of a vehicle, comprising a main gearing and:
- a second gearing, termed auxiliary gearing, composed of one of the gearwheels of the main gearing, of a third gearwheel, and of intermediate means for sequentially driving the third gearwheel that are able to rotate it stepwise by a predetermined angular value ($\alpha$) upon each complete rotation of the associated gearwheel of the main gearing, where ($\alpha$) is such that, in the course of a rotational travel of the steering wheel between the two steering locks, the total angular travel of the third gearwheel is less than or equal to 360°,
- a second angular sensor associated with the third gearwheel with the aim of measuring the angular position thereof, and
- a unit for managing the data provided by the first and second angular sensors, this unit being programmed in order:
- once the vehicle has started, in an "active" mode thereof, to calculate the angular position of the steering wheel from the angular values and from the values to the counter obtained by means of the first angular sensor, and
- upon starting of the vehicle, in a "wake" mode, to calculate the angular position of the steering wheel from, on the one hand, the value representative of the angular position of the second gearwheel obtained by means of the first angular sensor, and, on the other hand, from the value of the angular position of the third gearwheel obtained by means of the second angular sensor and representative of the number of revolutions made by the steering wheel.

Furthermore, each angular sensor advantageously consists of a magnetic angular sensor, such as a magnetoresistive sensor or a Hall-effect sensor, each gearwheel associated with one of said angular sensors being equipped with a magnet secured axially to said gearwheel opposite the angular sensor.

Moreover, the transmission ratio of the main gearing is, advantageously, substantially between 1.3 and 1.5.

The intermediate means for sequentially driving the third gearwheel are, advantageously for their part, designed to rotate it stepwise by an angular value ($\alpha$) of around 45°.

According to a first advantageous variant of the measuring device according to the invention, the auxiliary gearing comprises the second gearwheel of the main gearing, and intermediate means for sequentially driving the third gearwheel that comprise an intermediate gearwheel which is coaxial and in one piece with the second gearwheel and arranged so as to mesh with the third gearwheel.

Furthermore, the intermediate gearwheel then advantageously comprises two teeth defining a single notch, the third gearwheel comprising a number of uniformly distributed teeth defining an angle ($\alpha$) between each pair of teeth.

According to a second advantageous variant of the measuring device according to the invention, the auxiliary gearing comprises the first gearwheel of the main gearing, and intermediate means for sequentially driving the third gearwheel that comprise two intermediate gearwheels which are coaxial and in one piece:
- a first intermediate gearwheel designed to cooperate with uniformly distributed studs projecting from one of the front faces of the first gearwheel, and
- a second intermediate gearwheel arranged so as to mesh with the third gearwheel.

Other features, aims and advantages of the invention will become apparent from the detailed description given below with reference to the appended drawings which represent two preferred embodiments of the invention by way of nonlimiting examples. In these drawings.

The two embodiments of measuring devices according to the invention represented in the figures consist of devices for measuring the angular position, between two steering locks, of a steering wheel of a vehicle.

Figure 1:
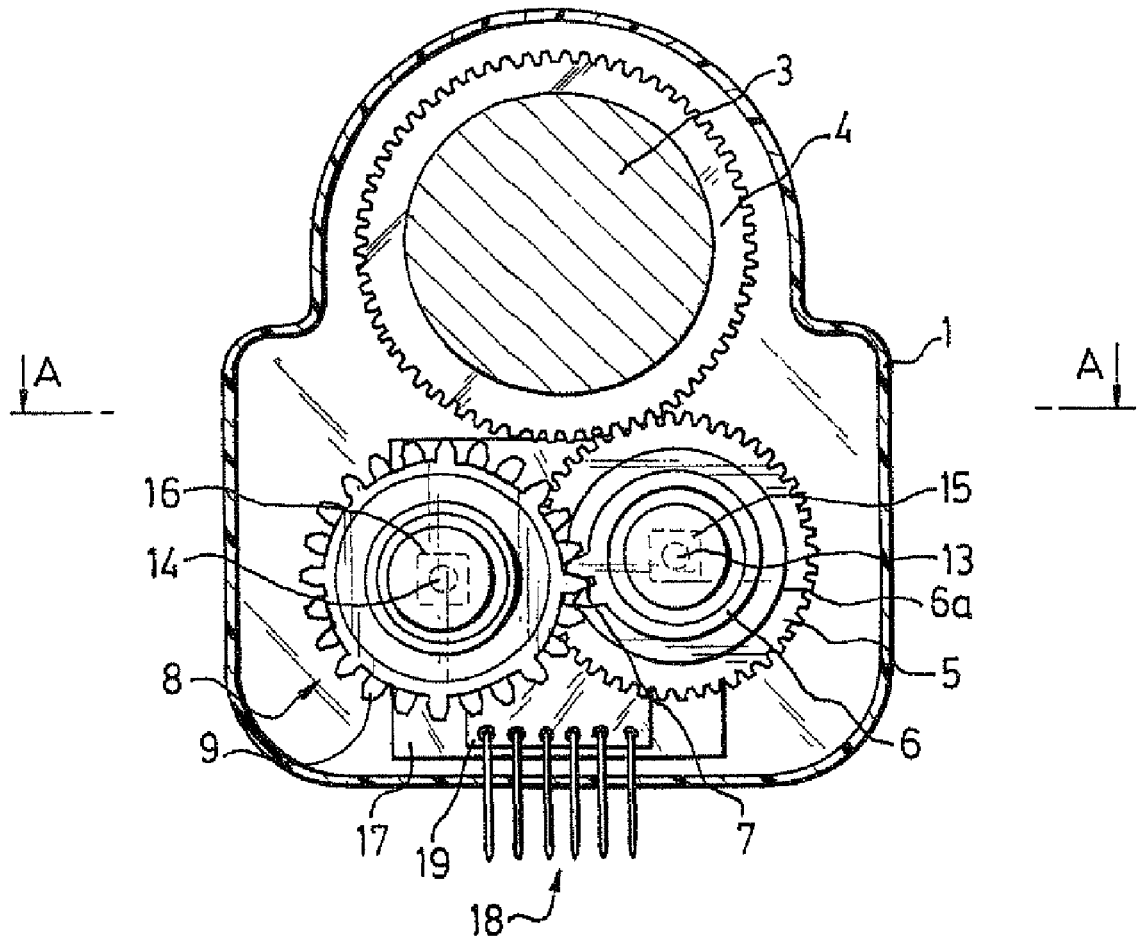
FIG. 1 is a bottom view, as seen in the direction of the arrow B, of the interior of a first embodiment of a measuring device according to the invention.
Figure 2:
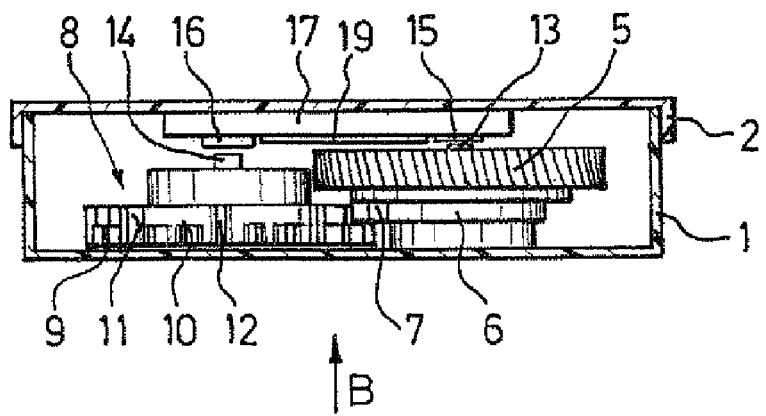
FIG. 2 is a section through a transverse plane A of this measuring device.

For this purpose, and as represented in FIGS. 1 and 2, these measuring devices are firstly incorporated in a housing 1 closed off by a cover 2, said housing and cover having an orifice drilled through them that enables them to be positioned around a steering column 3.

The measuring device represented in FIGS. 1 and 2 comprises, firstly, a main gearing composed of a first gearwheel 4 secured to the steering column 3 so as to turn therewith, and of a second gearwheel 5 rotatably mounted inside the housing 1.

By way of example, the transmission ratio of this main gearing 4-5 is equal to 66/46.

The measuring device presented in FIGS. 1 and 2 also comprises an auxiliary gearing composed of the second gearwheel 5 of the main gearing 4-5, of a third gearwheel 8, and of intermediate means for sequentially driving the third gearwheel 8 that are able to rotate it stepwise by a predetermined angular value ($\alpha$) upon each complete rotation of the second gearwheel 5.

According to the invention, furthermore, the value of the angle ($\alpha$) is such that, in the course of a rotational travel of the steering wheel between the two steering locks, the total angular travel of the third gearwheel 8 is less than or equal to 360°.

According to the embodiment represented in FIGS. 1 and 2, the intermediate means for sequentially driving the third gearwheel 8 comprise an intermediate gearwheel 6 which is coaxial and in one piece with the second gearwheel 5.

This intermediate gearwheel 6 comprises, in the example, two teeth defining a single notch 7.

The third gearwheel 8 comprises, for its part, a number of uniformly distributed teeth 11, 12, the number being 8 in the example, defining an angle (α) equal to 45° between each pair of teeth.

It is notable that, according to the first embodiment represented in the figures, this third gearwheel 8 is composed, in one piece, of two superposed coaxial gearwheels 9, 10: a lower gearwheel 9 having 24 teeth that is surmounted by an upper gearwheel 10 comprising the eight teeth 11, 12 formed by the upper continuation of 8 of the 24 teeth of the lower gearwheel 9.

According to this design, the teeth 11, 12 of the upper gearwheel 10 are designed to rotationally lock the gearwheel 8 by virtue of two of the teeth of the lower gearwheel 9 bearing on the peripheral wall 6a of the intermediate gearwheel 6.

Moreover, the second gearwheel 5 and the third gearwheel B are each equipped with a respective magnet 13, 14 secured axially to said gearwheel.

The measuring device represented in FIGS. 1 and 2 also comprises two magnetic sensors having a measurement range of 360°, such as "GMR" magnetoresistive sensors, each associated with one of the aforementioned gearwheels 5, 8 and centered on the axis of revolution thereof, opposite the corresponding magnet 13, 14.

These two angular sensors 15, 16 are connected to a printed circuit 17 comprising connection pins 18 for connecting the housing 1, 2 for example to a network.

The measuring device comprises, finally, a microprocessor (or ASIC) 19 likewise connected to the printed circuit 17 and programmed, as explained in detail below, to manage the data provided by the two angular sensors 15, 16.

Figure 3:
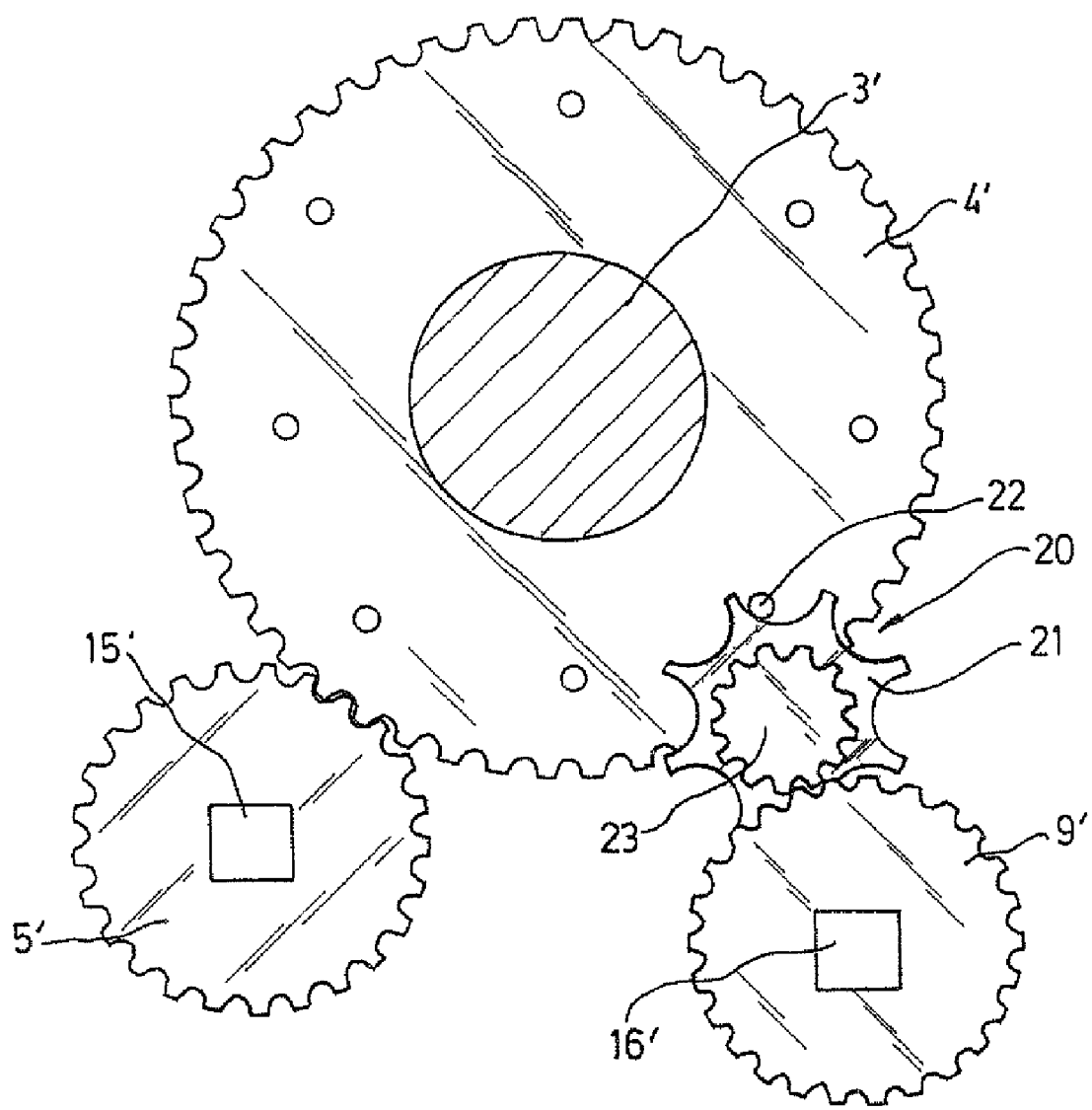
FIG. 3 is a schematic top view of a second embodiment of a measuring device according to the invention.

The measuring device represented in FIG. 3 comprises, firstly, a main gearing similar to that described above and therefore consisting of a first gearwheel 4', secured to the steering column 3', and of a second gearwheel 5'.

The auxiliary gearing of this second embodiment of the measuring device is composed of the first gearwheel 4' of the main gearing 4'-5', of a third gearwheel 9', and of intermediate means 20 for sequentially driving the third gearwheel 9, that comprise two intermediate gearwheels which are coaxial and in one piece:
- a first intermediate gearwheel 21 designed to cooperate with uniformly distributed studs, such as 22, projecting from one of the front faces of the first gearwheel 4'. In the example, this gearwheel 21 comprises 8 teeth arranged so as to cooperate with eight studs 22 distributed every 45°, and
- a second intermediate gearwheel 23 arranged so as to mesh with the third gearwheel 9'.

In the same way as above, such sequential drive means are designed to rotate the third gearwheel 9' stepwise by a predetermined angular value (α) equal to 450 upon each complete rotation of the first gearwheel 4'.

Lastly, this second measuring device also comprises two magnetic sensors 15', 16' having a measurement range of 360°, these sensors being respectively associated with the second gearwheel 5' and the third gearwheel 9', opposite magnets (not shown) secured to said gearwheels.

The operating principle of the measuring device according to the invention is explained below with reference to FIG. 4 and to the measuring device represented in FIGS. 1 and 2, it being understood that this principle is identical concerning the second measuring device represented in FIG. 3.

Figure 4:
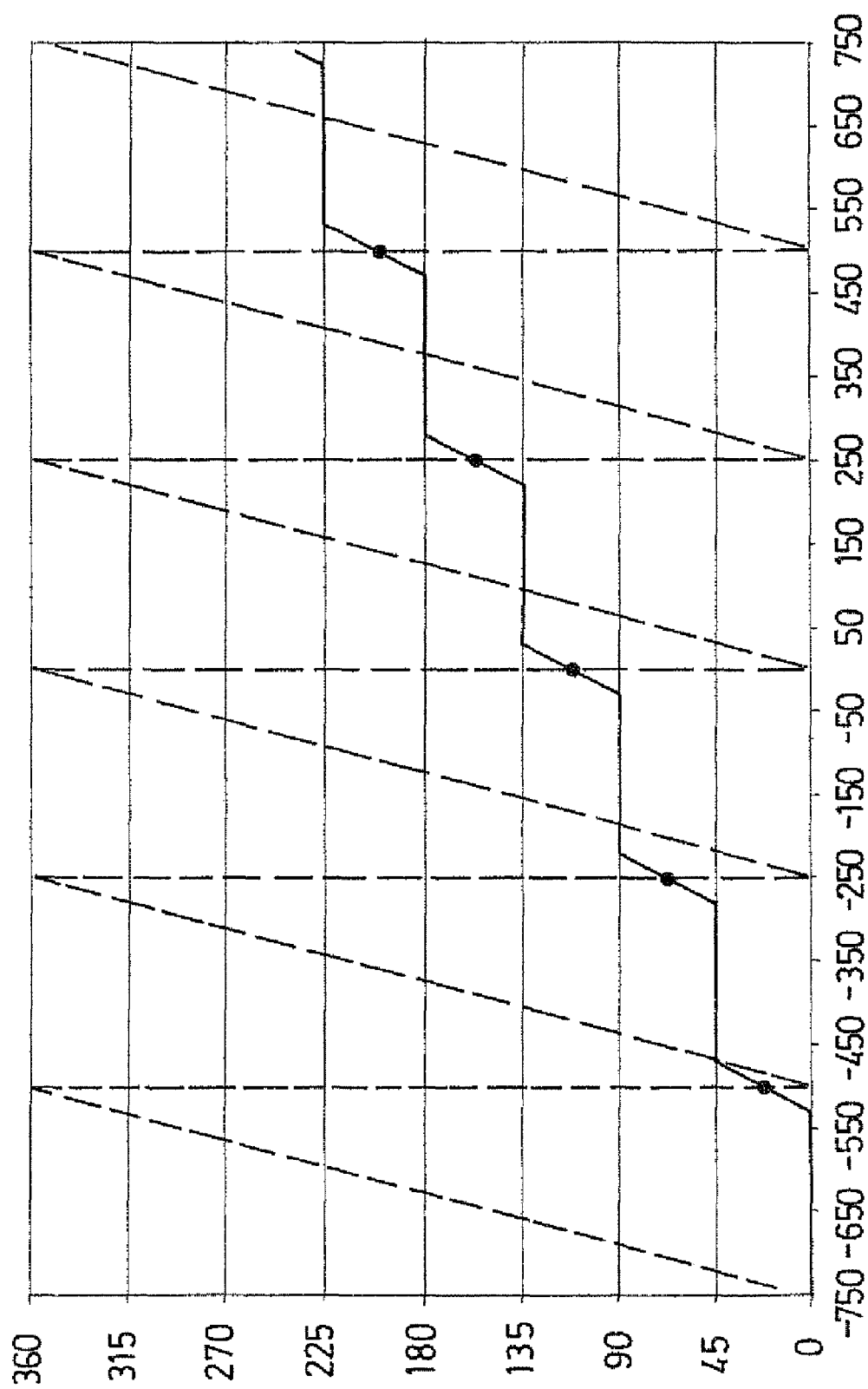
FIG. 4 is a graph illustrating the principle of measuring the angular position of a steering wheel of a vehicle according to the method of the invention.

Firstly, the microprocessor 19 is programmed to process the measurement signals delivered by the measuring sensor 13 of the main gearing, which are represented as broken lines in FIG. 4, in such a way as to:
- calculate, during each turn of the second gearwheel 5, values representative of the angular position of said gearwheel in the course of said turn, and
- positively or negatively increment, at the end of each turn, a counter consisting of a volatile memory for storing the number of revolutions made.

This microprocessor 19 is also programmed to process the measurement signals delivered by the measurement sensor 15 of the auxiliary gearing, forming steps represented as solid lines in FIG. 4, so as to calculate values representative of the angular positions of this gearing.

Thus, once the vehicle has started, in an "active" mode thereof, the microprocessor 19 is able to calculate the angular position of the steering wheel from the angular values and from the values of the counter obtained by means of the first angular sensor 15 alone.

By contrast, upon starting of the vehicle in a "wake" mode, the microprocessor 19 is able to calculate the angular position of the steering wheel from, on the one hand, the value representative of the angular position of the second gearwheel 5 obtained by means of the first angular sensor 15, and, on the other hand, from the value of the angular position of the third gearwheel 10 obtained by means of the second angular sensor 16 and representative of the number of revolutions made by the steering wheel.

According to this design, the device of the invention thus proves particularly capable of delivering and retaining information representative of the absolute angular position of a vehicle steering wheel, even in the absence of electrical power supply to the measuring device.

The invention claimed is:

1. Method of measuring the angular position, between two steering locks, of a steering wheel of a vehicle, comprising steps of:
   equipping said vehicle with a gearing, termed main gearing, composed of a first gearwheel (4; 4'), which is coupled in rotation to the steering wheel, and of a second gearwheel (5; 5'), and in measuring the angular position of the second gearwheel by means of a first angular sensor (15; 15') having a given measurement range, said first sensor, associated with the second gearwheel (5; 5'), being designed, upon a movement of the second gearwheel (5; 5') within the measurement range of this first sensor (15; 15'), to calculate values representative of the angular positions of this gearwheel within said measurement range, and at the ends of the measurement range, to positively or negatively increment a counter for storing the number of revolutions made; and
   equipping the vehicle with a second gearing, termed auxiliary gearing, composed of one of the gearwheels (5; 4') of the main gearing, of a third gearwheel (8; 9'), and of intermediate means (6, 7, 9-11; 20-23) for sequentially driving the third gearwheel (8; 9') and rotating the third gearwheel stepwise in increments of a predetermined angular value (α) upon each complete rotation of the associated gearwheel (5; 4') of the main gearing, where (α) is such that, in the course of a rotational travel of the steering wheel between the two steering locks, the total angular travel of the third gearwheel (8; 9') is less than or equal to 360°;

measuring the angular position of the third gearwheel (8; 9') by means of a second angular sensor (16; 16') associated with said third gearwheel; and managing the data provided by the first and second angular sensors in such a way that once the vehicle has started, in an "active" mode thereof, the absolute angular position of the steering wheel is calculated from the angular values and from the values of the counter obtained by means of the first angular sensor (15; 15'), and upon starting of the vehicle, in a "wake" mode, the absolute angular position of the steering wheel is calculated from the value representative of the angular position of the second gearwheel (5; 5') obtained by means of the first angular sensor (15; 15'), and from the value of the angular position of the third gearwheel (8; 9') obtained by means of the second angular sensor (16; 16') and representative of the number of revolutions made by the steering wheel.

2. Measuring method according to claim 1, characterized in that, in the active mode, the data provided by the second angular sensor (16; 16') are used for purposes of redundant calculation and for checking the value of the number of revolutions made that is provided by the storage counter.

3. Measuring method according to claim 1, characterized in that, in the event of a failure of the first angular sensor (15; 15'), in the active mode, an emergency stop mode of the vehicle is established during which the steering is managed using the data provided by the second angular sensor (16; 16').

4. Measuring method according to claim 1, characterized in that:
- a table of correspondence between the values provided by the second angular sensor (16; 16') and the corresponding values provided by the first angular sensor (15; 15') is stored, in a prior phase, for the entire travel of the steering wheel, and
- in the active mode of the vehicle, the values provided by the two angular sensors are compared with the stored values, and a malfunction signal is emitted when there is a lack of correspondence between said values.

5. Measuring method according to claim 1, characterized in that, in the active mode, the data provided by the first angular sensor (15; 15') are used for purposes of calculating the rotational speed of the steering wheel.

6. Device for measuring the angular position, between two steering locks, of a steering wheel of a vehicle, comprising:
- a gearing, termed main gearing, composed of a first gearwheel (4; 4'), which is coupled in rotation to the steering wheel, and of a second gearwheel (5; 5'), and a first angular sensor (15; 15') having a given measurement range, said first sensor, associated with the second gearwheel (5; 5'), being designed to make it possible, upon a movement of the second gearwheel (5; 5') within the measurement range of this first sensor (15; 15'), to calculate values representative of the angular positions of this gearwheel within said measurement range, and at the ends of the measurement range, of positively or negatively incrementing a counter for storing the number of revolutions made;
- a second gearing, termed auxiliary gearing, composed of one of the gearwheels (5; 4') of the main gearing, of a third gearwheel (8; 9'), and of intermediate means (6, 7, 9-11; 20-23) for sequentially driving the third gearwheel (8; 9') and rotating the third gearwheel stepwise in increments of a predetermined angular value ($\alpha$) upon each complete rotation of the associated gearwheel (5; 4') of the main gearing, where ($\alpha$) is such that, in the course of a rotational travel of the steering wheel between the two steering locks, the total angular travel of the third gear wheel (8; 9') is less than or equal to 360°;
- a second angular sensor (16; 16') associated with the third gearwheel (8; 9') with the aim of measuring the angular position thereof; and
- a unit (19) for managing the data provided by the first and second angular sensors, this unit being programmed once the vehicle has started, in an "active" mode thereof, to calculate the angular position of the steering wheel from the angular values and from the values of the counter obtained by means of the first angular sensor (15; 15'), and upon starting of the vehicle, in a "wake" mode, to calculate the angular position of the steering wheel from the value representative of the angular position of the second gearwheel (5; 5') obtained by means of the first angular sensor (15; 15'), and from the value of the angular position of the third gearwheel (8; 9') obtained by means of the second angular sensor (16; 16') and representative of the number of revolutions made by the steering wheel.

7. Measuring device according to claim 6, characterized in that each angular sensor (15, 16; 15', 16') consists of a magnetic angular sensor, each gearwheel (5, 8; 5, 9') associated with one of said angular sensors being equipped with a magnet (13, 14) secured axially to said gearwheel opposite the angular sensor.

8. Measuring device according to claim 6, characterized in that the transmission ratio of the main gearing (4, 5) is substantially between 1.3 and 1.5.

9. Measuring device according to claim 6, characterized in that the intermediate means (6, 7, 9-11; 20-23) for sequentially driving the third gearwheel (8; 9') are designed to rotate it stepwise in increments of an angular value ($\alpha$) of around 45°.

10. Measuring device according to claim 6, characterized in that the auxiliary gearing (5, 8) comprises the second gearwheel (5) of the main gearing (4, 5), and intermediate means for sequentially driving the third gearwheel (8) that comprise an intermediate gearwheel (6) which is coaxial and in one piece with the second gearwheel (5) and arranged so as to mesh with the third gearwheel (8).

11. Measuring device according to claim 10, characterized in that the intermediate gearwheel (6) comprises two teeth (7) defining a single notch, the third gearwheel (8) comprising a number of uniformly distributed teeth (11, 12) defining an angle ($\alpha$) between each pair of teeth.

12. Measuring device according to claim 6, characterized in that the auxiliary gearing (4', 9') comprises the first gearwheel (4') of the main gearing (4', 5'), and intermediate means for sequentially driving the third gearwheel (9') that comprise two intermediate gearwheels which are coaxial and in one piece:
- a first intermediate gearwheel (21) designed to cooperate with uniformly distributed studs (22) projecting from one of the front faces of the first gearwheel (4'), and
- a second intermediate gearwheel (23) arranged so as to mesh with the third gearwheel (9').

13. Measuring method according to claim 2, characterized in that, in the event of a failure of the first angular sensor (15; 15'), in the active mode, an emergency stop mode of the vehicle is established during which the steering is managed using the data provided by the second angular sensor (16; 16').

14. Measuring method according to claim 2, characterized in that:

a table of correspondence between the values provided by the second angular sensor (16; 16') and the corresponding values provided by the first angular sensor (15; 15') is stored, in a prior phase, for the entire travel of the steering wheel, and in the active mode of the vehicle, the values provided by the two angular sensors are compared with the stored values, and a malfunction signal is emitted when there is a lack of correspondence between said values.

15. Measuring device according to claim 7, characterized in that the transmission ratio of the main gearing (4, 5) is substantially between 1.3 and 1.5.

16. Measuring device according to claim 7, characterized in that the intermediate means (6, 7, 9-11; 20-23) for sequentially driving the third gearwheel (8; 9') are designed to rotate it stepwise in increments of an angular value ($\alpha$) of around 45°.

17. Measuring device according to claim 8, characterized in that the intermediate means (6, 7, 9-11; 20-23) for sequentially driving the third gearwheel (8; 9') are designed to rotate it stepwise in increments of an angular value ($\alpha$) of around 45°.

18. Measuring device according to claim 7, characterized in that the auxiliary gearing (5, 8) comprises the second gearwheel (5) of the main gearing (4, 5), and intermediate means for sequentially driving the third gearwheel (8) that comprise an intermediate gearwheel (6) which is coaxial and in one piece with the second gearwheel (5) and arranged so as to mesh with the third gearwheel (8).

19. Measuring device according to claim 7, characterized in that the auxiliary gearing (4', 9') comprises the first gearwheel (4') of the main gearing (4', 5'), and intermediate means for sequentially driving the third gearwheel (9') that comprise two intermediate gearwheels which are coaxial and in one piece:

a first intermediate gearwheel (21) designed to cooperate with uniformly distributed studs (22) projecting from one of the front faces of the first gearwheel (4'), and a second intermediate gearwheel (23) arranged so as to mesh with the third gearwheel (9').

20. Measuring device according to claim 8, characterized in that the auxiliary gearing (4', 9') comprises the first gearwheel (4') of the main gearing (4', 5'), and intermediate means for sequentially driving the third gearwheel (9') that comprise two intermediate gearwheels which are coaxial and in one piece:

a first intermediate gearwheel (21) designed to cooperate with uniformly distributed studs (22) projecting from one of the front faces of the first gearwheel (4'), and a second intermediate gearwheel (23) arranged so as to mesh with the third gearwheel (9').

\* \* \* \* \*